United States Patent
Janssen et al.

(10) Patent No.: US 6,926,588 B2
(45) Date of Patent: Aug. 9, 2005

(54) BAND COIL

(75) Inventors: Henricus Wilhelmus Aloysius Janssen, Eindhoven (NL); Johannes Petrus Martinus Bernardus Vermeulen, Eindhoven (NL); Fransiscus Marinus Andrea Maria Van Gaal, Eindhoven (NL); Petrus Carolus Maria Frissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/011,895

(22) Filed: Dec. 6, 2001

(65) Prior Publication Data

US 2002/0079775 A1 Jun. 27, 2002

(30) Foreign Application Priority Data

Dec. 11, 2000 (EP) .............................. 00204428

(51) Int. Cl.$^7$ ................................ B24B 1/00
(52) U.S. Cl. ............... 451/28; 451/28; 451/41; 451/57; 451/58; 29/603.23; 29/603.26
(58) Field of Search .............. 451/28, 41, 57, 451/58; 29/602.1, 606, 603.23–603.26; 310/208, 198, 268, 184, 179, 180

(56) References Cited

U.S. PATENT DOCUMENTS

| | | | | |
|---|---|---|---|---|
| 1,244,709 A | * | 10/1917 | Davenport | 310/208 |
| 1,451,374 A | * | 4/1923 | Rogers | 140/92.2 |
| 2,071,977 A | * | 2/1937 | Herrick | 310/208 |
| 2,318,052 A | * | 5/1943 | Bramble et al. | 451/296 |
| 2,921,207 A | * | 1/1960 | Fletcher | 310/206 |
| 4,229,671 A | * | 10/1980 | Lesokhin et al. | 310/198 |
| 4,819,322 A | * | 4/1989 | Higuchi et al. | 29/605 |
| 5,065,059 A | * | 11/1991 | Adams et al. | 310/71 |
| 5,744,896 A | * | 4/1998 | Kessinger et al. | 310/268 |
| 5,866,965 A | * | 2/1999 | Baronosky et al. | 310/208 |
| 6,011,339 A | * | 1/2000 | Kawakami | 310/208 |
| 6,137,202 A | * | 10/2000 | Holmes et al. | 310/180 |
| 6,322,428 B1 | * | 11/2001 | Kondo | 451/58 |
| 6,373,164 B1 | * | 4/2002 | Nishimura | 310/207 |
| 6,374,904 B1 | * | 4/2002 | Hurst | 165/78 |
| 6,791,224 B1 | * | 9/2004 | Ozawa et al. | 310/179 |

\* cited by examiner

Primary Examiner—George Nguyen
(74) Attorney, Agent, or Firm—Aaron Waxler

(57) ABSTRACT

The invention relates to a method of manufacturing a band coil by means of a material-removing process performed on the coils so as to obtain a band coil which has a profile in the direction of the coil axis. Such a process may be a discharge process, an etching process or a mechanical grinding process. The obtained band coils may have such a shape that certain coil sides are effective whereas other coil sides are interfering as little as possible. Such band coils can be very successful in planar motors.

5 Claims, 5 Drawing Sheets

BAND COIL

The invention relates to a method of manufacturing a coil formed by a coiled, band-shaped, current-conducting foil, which coil has a coil axis.

The invention also relates to a coil, an assembly of such coils, as well as to a translatory or rotary motor in which such coils or coil assemblies are used.

Figure 8:
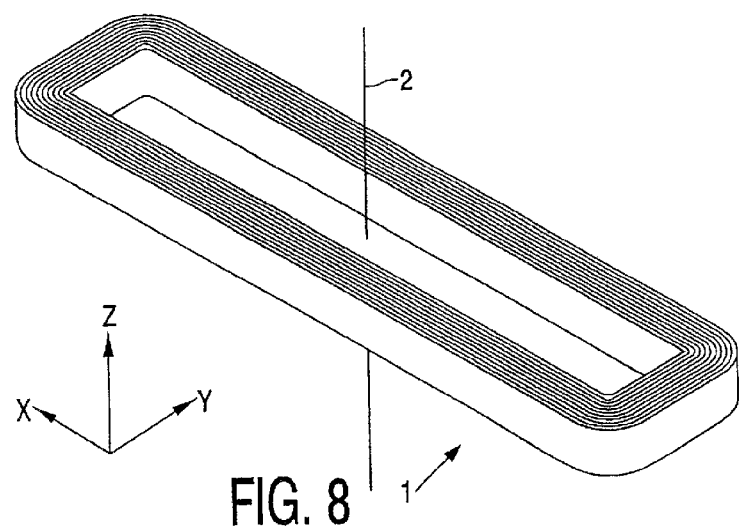

The method of manufacturing a band coil as mentioned above is known from U.S. Pat. No. 4,819,322. A metal foil insulated at two sides is wound on a mandrel in this method. The mandrel is removed and the wound foil is cut into a number of slices in a direction perpendicular to the longitudinal direction of the wound foil by means of an electric spark erosion process. The slices thus formed are the band coils. Depending on the cross-sectional dimensions of the mandrel, band coils obtained in this manner may have various shapes. An example of such a band coil 1 is depicted in FIG. 8. The coil axis 2 of a band coil is the axis which is perpendicular to the plane of the turns 3 and is situated in the center of the turns, i.e. in fact the axis around which the foil was wound. In an X-Y-Z system of coordinates, therefore, the turns lie in the X-Y plane, and the coil axis extends in the Z-direction. The advantage of band coils over known wire-wound coils, which are used in the great majority of cases, is the greater filling factor of the conductor (usually copper), whereby a much higher effectivity is achieved, but most of all whereby dissipated energy in the form of heat can be removed much more effectively than in wire coils, because the heat flux goes through transitions of air and insulation with bad heat conduction in the case of wire-wound coils, whereas the heat flux in band coils goes mainly through copper with a much better heat conduction. The cost of manufacture of band coils, however, is much higher than that of wire coils. A disadvantage of the band coils known until now, however, is their planar shape, i.e. the height of the band coil is constant. An example of an application of a planar band coil is described in U.S. Pat. No. 5,866,965, where a number of band coils are provided around the stator poles of the stator of a rotary motor. The application of the band coil is limited thereto. Coils usually have effective and ineffective winding sides. The effective winding sides, also referred to as coil sides, supply the desired force. The ineffective winding sides usually have an interfering influence on the operation of the coil. The ineffective winding sides are bent away from the plane in which the effective winding sides are situated in the case of wire-wound coils, or the coil is wound such that certain winding sides have as small as possible a disturbing influence. This is not possible in the case of band coils.

The invention has for its object to obtain a band coil in a three-dimensional shape, such that a wide range of applications is achieved.

The method according to the invention is for this purpose characterized in that the coil is given a profile in a direction parallel to the coil axis of the coil by means of a bulk-removing operation performed on the coil turns. Coils can be obtained by this method which are suitable for many applications, such as in motors, but also, for example, as deflection coils in TV sets.

The bulk-removing treatment may be a spark erosion process, for example a wire sparking process, or an etching process, or an electrochemical process, or a machining process such as a grinding or milling process.

The invention also relates to a coil formed by a wound band-shaped, current-conducting foil with a coil axis. Such a band coil is also known from U.S. Pat. No. 5,866,965. As was noted above, such band coils have a limited range of applications owing to their planar shape. All winding sides lie in the same plane, so that usually two mutually opposed winding sides, or at least portions of these winding sides, adversely affect the operation of the coil. To increase the range of applications, the coil according to the invention is characterized in that at least a portion of the winding sides is staggered with respect to the remaining portion of the winding sides in a direction parallel to the coil axis of the coil. Ineffective portions of the winding sides as a result lie in a different plane from the effective winding sides. Preferably, the coil has two pairs of mutually opposed winding sides, the one pair of mutually opposed winding sides being staggered relative to the other pair of mutually opposed winding sides in a direction parallel to the coil axis of the coil. As a result, the two pairs of mutually opposed winding sides lie in different planes, so that it is simple to position the coil in the respective application such that only one of the two pairs of mutually opposed winding sides is effective, and the other pair of winding sides has as little adverse effect as possible. Such a coil may be manufactured by the method according to the invention as described above.

The invention also relates to an assembly of at least two coils, wherein between a pair of mutually opposed winding sides of one of the coils according to the invention at least one winding side of another coil is situated. The other coil may be a coil according to the invention, but this need not necessarily be the case.

The invention furthermore relates to a translatory or rotary motor with two parts which are movable relative to one another, the one part comprising a system of magnets and the other part at least one coil or an assembly of at least two coils according to the invention, while one pair of mutually opposed winding sides of a coil lie closer to said one part than does the other pair of mutually opposed winding sides.

The invention will now be explained in more detail with reference to a few embodiments.

Figure 1:
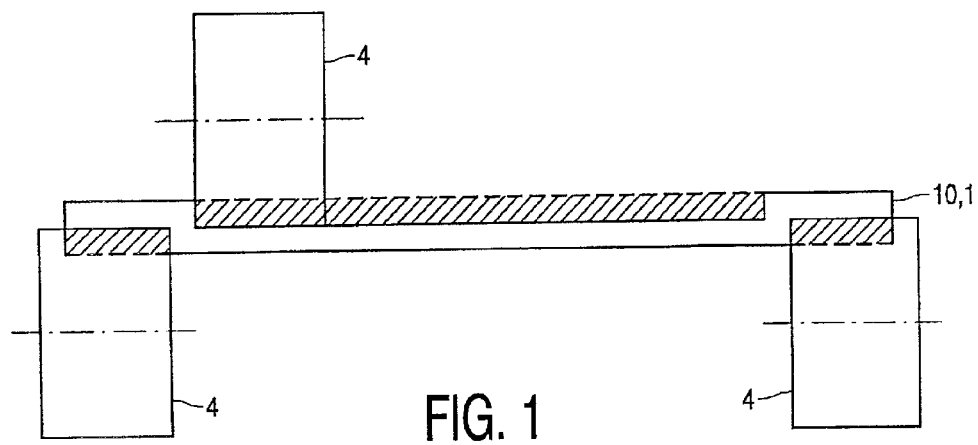
Figure 2:
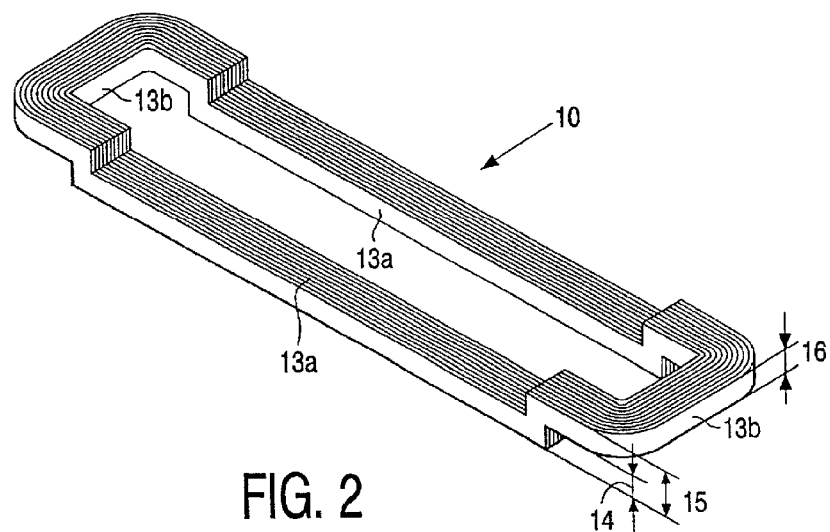
Figure 3:
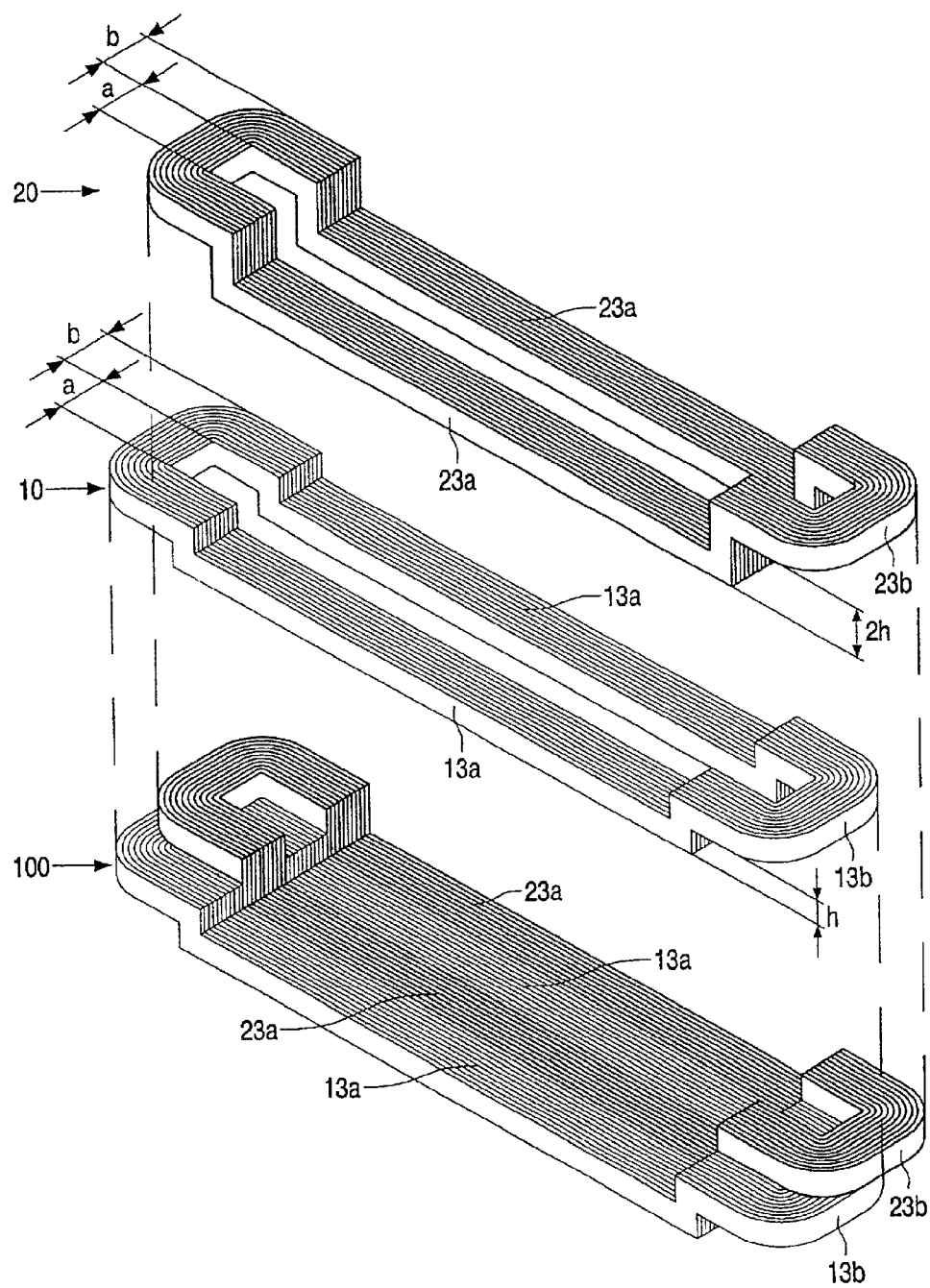
Figure 4:
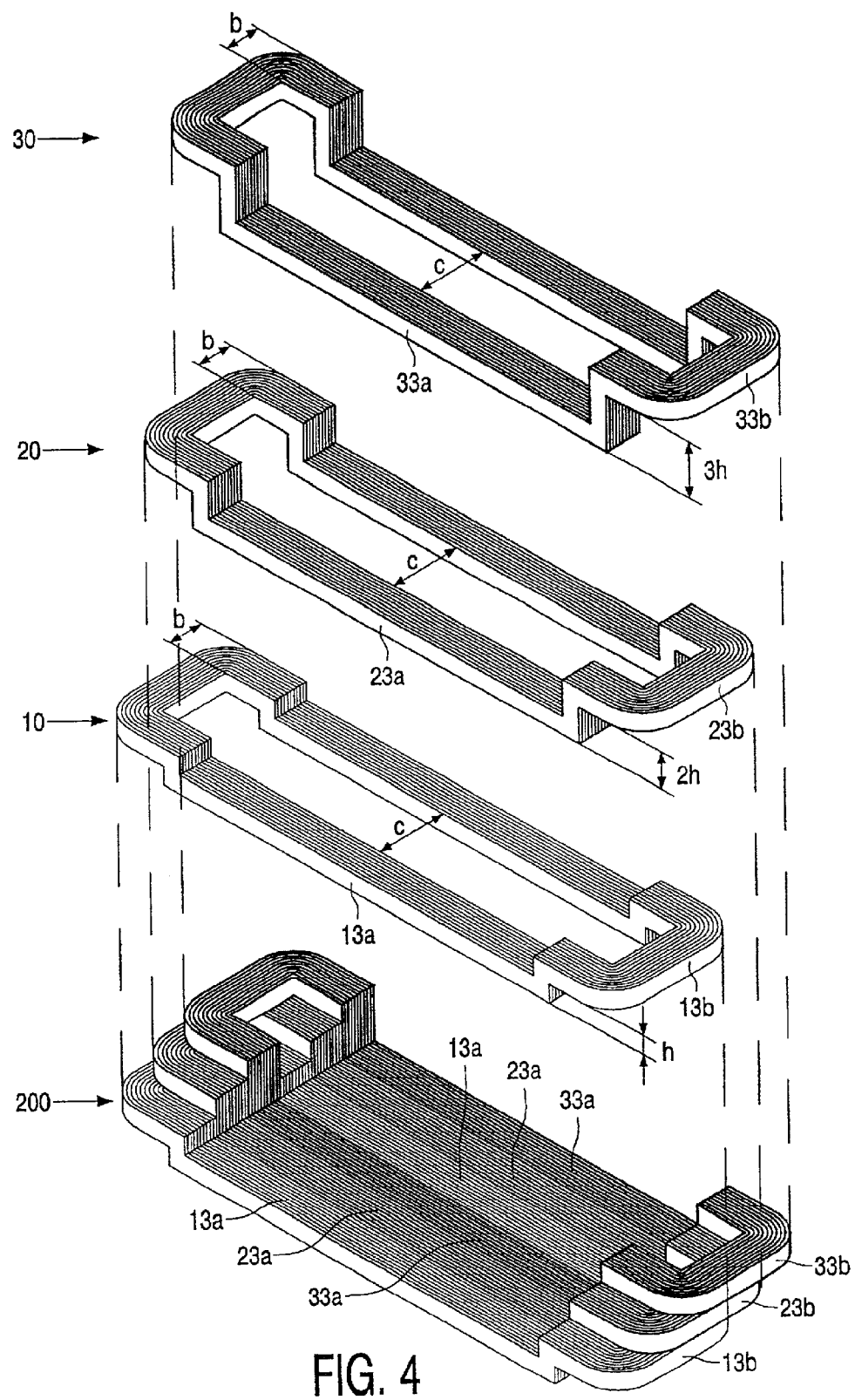
Figure 5:
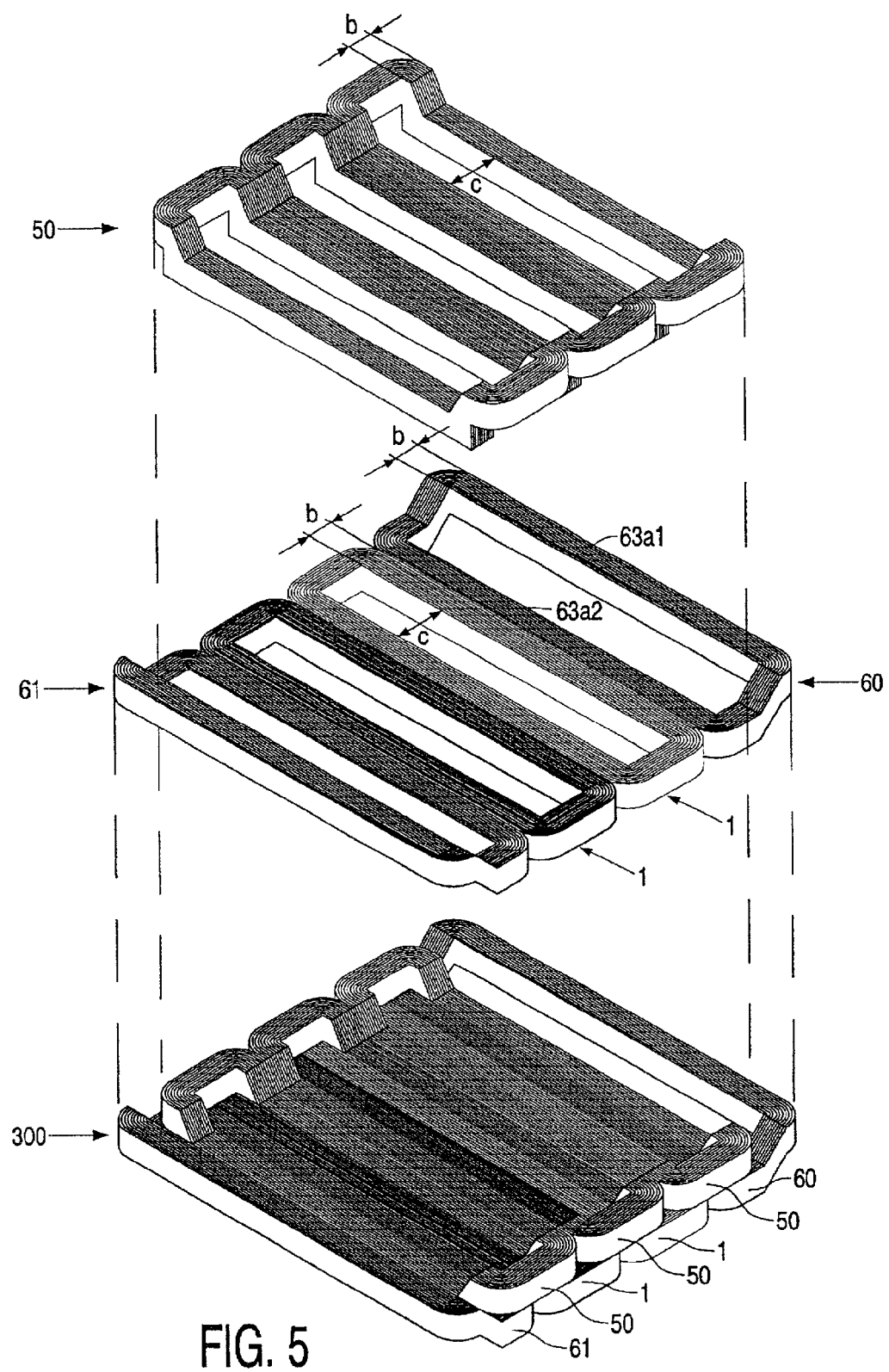
Figure 6:
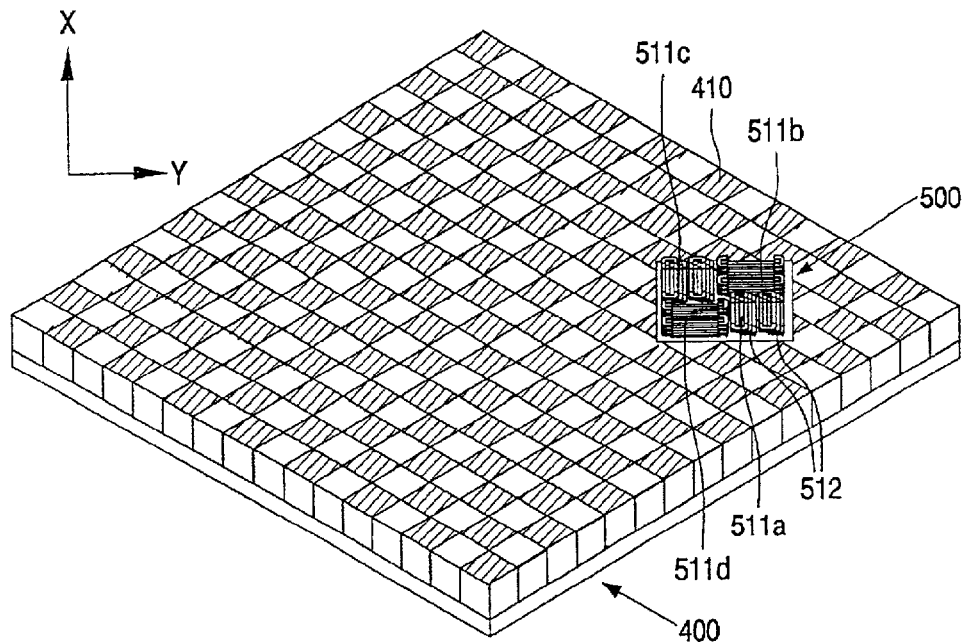
Figure 7:
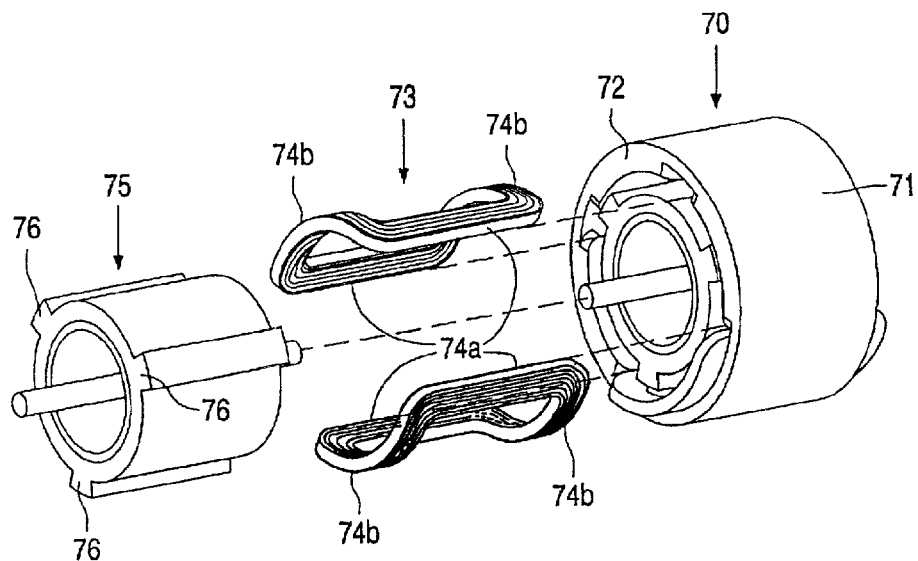

FIG. 1 diagrammatically shows a method by which a profile is provided in a band coil as shown in FIG. 8, FIG. 2 shows the profiled band coil obtained by the method in perspective view, FIG. 3 shows an assembly of two band coils as shown in FIG. 2, FIG. 4 shows an assembly of three band coils as shown in FIG. 2, FIG. 5 shows an assembly of band coils in which profiled band coils according to a second embodiment are used, FIG. 6 diagrammatically and in perspective view shows a planar motor with an assembly of band coils as shown in FIG. 4, FIG. 7 diagrammatically shows a rotary motor in which a profiled band coil according to the invention is used, and FIG. 8 shows a band coil according to the prior art.

FIG. 1 diagrammatically shows how, starting from a band coil 1 as depicted in FIG. 8 and obtained, for example, by the method described in U.S. Pat. No. 4,819,322, a profile is provided in the winding sides. The hatched portions are removed from the band coil by means of milling tools, for example diamond milling tools 4. If necessary, the resulting milling surfaces may be given an after-treatment for preventing the bands or turns of the band coil from making contact with one another. Such a profile may alternatively be obtained through other processes such as a spark erosion process, an etching process, or an electrochemical process. It will be obvious that practically all desired profiles may be obtained. FIG. 2 shows an example of a profiled band coil 10. Seen from the upper side, the height 14 of almost the entire long winding sides 13a has been halved with respect to the original height 15 of the winding sides before the treatment. The height 16 of the short winding sides 13b is also halved, but from the lower side in this case. The cross-sectional dimension of the band-shaped turns has remained approximately constant in this manner.

FIG. 3 shows how two such profiled band coils of FIG. 2 may be joined together into an assembly 100. The band coil 10 is identical to the band coil shown in FIG. 2, i.e. the short winding sides 13b lie one band level h higher than the long winding sides 13a. The short winding sides 23b of the band coil 20 lie two band levels 2 h higher than the long winding sides 23a. The two band coils may be laid one on the other such that one of the long winding sides of the one band coil comes to lie exactly between the two long other winding sides of the other band coil. The distance a between two long winding sides of one band coil is accordingly nominally equal to the width b of the foil package of one winding side. As a result, all long winding sides lie in one plane and against one another in the assembly. The short winding sides will lie in stages one above the other, all lying above the upper side of the long winding sides.

The embodiment of FIG. 4 is comparable to that of FIG. 3, but here three band coils have been stacked so as to form an assembly 200. The short winding sides 13b of the band coil 10 lie one band level h higher than the long winding sides 13a, the short winding sides 23b of the band coil 20 lie two band levels 2 h higher than the long winding sides 23a, and the short winding sides 33b of the band coil 30 lie three band levels 3 h higher than the long winding sides 33a. The distance c between the long winding sides of each band coil now is nominally equal to twice the width b of the foil package of a winding side. In the assembly, all long winding sides 13a, 23a, 33a lie against one another and in one plane, while all short winding sides 13b, 23b, 33b lie in stages one above the other and higher than the upper side of the long winding sides 13a, 23a, 33a. An application of such an assembly of band coils is shown in FIG. 6.

FIG. 5 shows an alternative embodiment of an assembly of profiled band coils. The shape of the three identical band coils 50 is comparable to that of the band coils 10 of FIG. 2. The two identical band coils 1 are planar band coils as shown in FIG. 8. The two outermost band coils 60, 61 are somewhat different in shape. In these band coils, one of the long winding sides $63a_1$ lies higher than the other long winding side $63a_2$. In the assembly 30, the band coil 60 is mirrored symmetrically in its position with respect to the band coil 61. The distance c between the long winding sides of each band coil is twice the width b of the foil package of a long winding side again, so that two winding sides, each of a different band coil, will lie between the long winding sides of a band coil each time in the assembly, with the exception of the long winding sides $63a_1$ of the outermost band coils. These winding sides lie above the upper side of all other long winding sides, as do a number of short winding sides. In this manner, therefore, twelve long winding sides lie next to one another in one and the same plane in this assembly.

FIG. 6 diagrammatically shows the principle of a planar motor. In such a motor, two parts 400, 500 which are movable relative to one another, with the one part 400, usually a stationary part, comprising a system of magnets 410 of alternating N and S poles, and the other, movable part 500 comprising a system of coils 510. Such a planar motor is known from WO . . . (being the PCT patent application EP 00/07970=PHN17.621, which is to be replaced in due time by the publication no. WO . . . of the PCT application). The system of coils for this planar motor is formed by four coil block units 511a, 511b, 511c, 511d, each unit comprising two coil blocks 512 situated next to one another. Each coil block has six current conductors which are present in the magnetic field of the system of magnets. The current conductors accordingly are the long, effective winding sides or coil sides of the coils. The current conductors of the coil block units 511a and 511c extend in the X-direction, whereas the current conductors of the coil block units 511b and 511d extend in the Y-direction. The current conductors are supplied from a 3-phase system. The movable part 400 can move in a controlled manner in the X-Y-plane immediately above the stationary part 500 comprising the system of magnets through commutation of the current. Lorenz forces exerted on the coil block units 511b and 511d cause a movement in the X-direction, and Lorenz forces exerted on the coil block units 511a and 511c cause a movement in the Y-direction. Each coil block in this application is formed by the assembly 200 of coils as depicted in FIG. 4. The long winding sides of the coils lie immediately above the surface of the magnets of the system of magnets. The Lorenz forces arising here are the forces which render it possible to obtain a controlled movement. Lorenz forces also arise at the short winding sides. These forces have a disturbing effect on the desired movement. To reduce this disturbing effect, the Lorenz forces at these short winding sides must be as small as possible. This is achieved in that the short winding sides are brought to a greater distance from the surface of the system of magnets, and thus farther away from the influence of the magnetic field. This is possible with the coils in accordance with the present invention. Obviously, it would also be possible in the case of the known wire-wound coils to bend away said short winding sides from the influence of the magnetic field. As was noted above, however, these wire coils are much less effective, i.e. the force supplied by a wire coil is much smaller than the force supplied by a band coil. This is caused on the one hand by the higher filling factor of copper of band coils compared with wire coils, and on the other hand by a much greater current density being practicable in band coils as a result of a much more efficient heat removal. The assembly of band coils shown in FIG. 5 might also be used in the planar motor of FIG. 6. Such an assembly then forms one coil block unit 511(a, b, c, or d).

Finally, FIG. 7 shows an example of a band coil according to the invention used in a rotary motor. The stator 70 is formed by a hollow cylinder 71. The inner surface of the cylinder is provided with a number of stator poles 72 which extend in longitudinal direction of the cylinder. The stator poles 72 have a bent shape, in fact they form part of a cylinder. The stator is made of a magnetizable material, such as iron. The band coils 73 have a bent shape, i.e. the shapes of two mutually opposed winding sides 74b are adapted to the shape of the stator poles 72. The other winding sides 74a are straight or faintly curved over the width of this winding side. The rotor 75 is provided with rotor poles 76. The rotor is also made of a magnetizable material, such as iron. Further details on the operation of such a rotary motor are given in U.S. Pat. No. 5,866,965. It is obviously also possible to use one or several assemblies of band coils similar to those shown in FIGS. 3 to 5, but with curved winding sides, in a rotary motor in such a manner.

Since band coils according to the invention may be given any three-dimensional shape, their application in very complicated motors, which have to enable both rotary and linear movements, is possible.

Band coils according to the invention may also be successfully used for the deflection of electron beams in TV sets. The band coil may be brought into a shape in which all coil sides are effective.

What is claimed is:

1. A method of manufacturing a coil comprising: forming a wound band-shaped, current-conducting coil, which coil has a coil axis, performing a bulk-removing operation on the coil turns of the coil along every plane on which the coil turns lie, and generating a profile having a staggered configuration of at least a portion of winding sides with respect to a remaining portion of winding sides in a direction parallel to the coil axis of the coil.

2. A method as claimed in claim 1, characterized in that the bulk-removing process is a spark erosion process.

3. A method as claimed in claim 1, characterized in that the bulk-removing process is an etching process.

4. A method as claimed in claim 1, characterized in that the bulk-removing process is an electrochemical process.

5. A method as claimed in claim 1, characterized in that the bulk-removing process is a mechanical machining process.

* * * * *